(12) United States Patent
Wei

(10) Patent No.: US 9,071,704 B2
(45) Date of Patent: Jun. 30, 2015

(54) OPTIMAL DOWNSTREAM POWER BACK-OFF FOR DIGITAL SUBSCRIBER LINES

(75) Inventor: Dong Wei, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 324 days.

(21) Appl. No.: 13/458,160

(22) Filed: Apr. 27, 2012

(65) Prior Publication Data

US 2012/0275576 A1 Nov. 1, 2012

Related U.S. Application Data

(60) Provisional application No. 61/479,719, filed on Apr. 27, 2011.

(51) Int. Cl.
H04M 3/22 (2006.01)
H04M 11/06 (2006.01)
H04B 3/32 (2006.01)
H04B 3/46 (2015.01)

(52) U.S. Cl.
CPC ............... *H04M 11/062* (2013.01); *H04B 3/32* (2013.01); *H04B 3/464* (2013.01)

(58) Field of Classification Search
USPC ........ 455/13.4, 425, 522, 295, 571, 572, 574; 379/32.04, 22.08, 26.01, 93.36, 379/395.01, 417
See application file for complete search history.

(56) References Cited

U.S. PATENT DOCUMENTS

2004/0024913 A1 2/2004 Ikeda et al.
2007/0237214 A1 10/2007 Duvaut et al.
2010/0246606 A1* 9/2010 Cendrillon et al. ........... 370/485

OTHER PUBLICATIONS

"Series G: Transmission Systems and Media, Digital Systems and Networks, Digital Sections and Digital Line System-Access Networks, Very High Speed Digital Subscriber Line Transceivers 2 (VDSL2)," ITUT G.993.2, Feb. 2006, 252 pages.

"Series G: Transmission Systems and Media, Digital Systems and Networks, Digital Sections and Digital Line System-Access Networks, Asymmetric Digital Subscriber Line Transceivers 2 (ADSL2)," ITUT G.992.3, Apr. 2009, 404 pages.

"Series G: Transmission Systems and Media, Digital Systems and Networks, Digital Sections and Digital Line System-Access Networks, Physical Layer Management for Digital Subscriber Line (DSL) Transceivers," ITUT G.997.1, Apr. 2009, 128 pages.

Foreign Communication From a Related Counterpart Application, PCT Application PCT/US2012/035545, International Search Report dated Jul. 5, 2012, 4 pages.

Foreign Communication From a Related Counterpart Application, PCT Application PCT/US2012/035545, Written Opinion dated Jul. 5, 2012, 5 pages.

Foreign Communication From A Counterpart Application, Chinese Application No. 201280019654.8, Chinese Office Action dated Jan. 30, 2015, 8 pages.

Foreign Communication From A Counterpart Application, Chinese Application No. 201280019654.8, Chinese Search Report dated Jan. 20, 2015, 2 pages.

* cited by examiner

*Primary Examiner* — Yosef K Laekemariam
(74) *Attorney, Agent, or Firm* — Conley Rose, P.C.; Grant Rodolph; William H. Dietrich

(57) ABSTRACT

A method comprising determining a plurality of power spectrum density (PSD) profiles for a plurality of cabinet-deployed digital subscriber lines (DSLs) comprising jointly and iteratively determining a plurality of cutoff frequencies based on crosstalk coupling parameters among the DSLs, wherein the cutoff frequencies and PSD profiles are in one to one correspondence, and wherein each profile comprises a reduced PSD portion below the cutoff frequency of the profile and a maximum PSD portion above the cutoff frequency.

4 Claims, 9 Drawing Sheets

OPTIMAL DOWNSTREAM POWER BACK-OFF FOR DIGITAL SUBSCRIBER LINES

CROSS-REFERENCE TO RELATED APPLICATIONS

The present application claims priority to U.S. Provisional Patent Application No. 61/479,719 filed Apr. 27, 2011 by Dong Wei and entitled "Optimal Downstream Power Back-Off for Digital Subscriber Lines", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk may limit the performance of some DSL technologies, such as asymmetric DSL 2 (ADSL2) and very high bit rate DSL 2 (VDSL2). Crosstalk may occur in mixed deployment scenarios, where cabinet-deployed lines and exchange-deployed lines operate within relatively short proximity or in the same binder. For example, cabinet-deployed lines (with relatively shorter deployment distances) may introduce crosstalk interference into the exchange-deployed lines (with relatively longer deployment distances). At a point where the cabinet-deployed lines enter the shared binder, signals in the exchange-deployed lines may have already traveled some distance and somewhat attenuated. Thus, the far-end crosstalk (FEXT) introduced at this point may significantly affect the signals in the exchange-deployed lines—sometimes completely overpowering the desired transmission signals. This crosstalk problem may be referred to as the "near-far" problem.

SUMMARY

In one embodiment, the disclosure includes a method comprising determining a plurality of power spectrum density (PSD) profiles for a plurality of cabinet-deployed DSLs comprising jointly and iteratively determining a plurality of cutoff frequencies based on crosstalk coupling parameters among the DSLs, wherein the cutoff frequencies and PSD profiles are in one to one correspondence, and wherein each profile comprises a reduced PSD portion below the cutoff frequency of the profile and a maximum PSD portion above the cutoff frequency.

In another embodiment, the disclosure includes an apparatus comprising a processor configured to determine a plurality of power spectrum density (PSD) profiles for a plurality of cabinet-deployed DSLs comprising jointly and iteratively determining a plurality of cutoff frequencies based on crosstalk coupling parameters among the DSLs, wherein the cutoff frequencies and PSD profiles are in one to one correspondence, and wherein each profile comprises a reduced PSD portion below the cutoff frequency of the profile and a maximum PSD portion above the cutoff frequency.

In yet another embodiment, the disclosure includes an apparatus comprising a processor configured to determine crosstalk coupling parameters among a plurality of DSLs, jointly and iteratively determine a cutoff frequency for each of a plurality of power spectrum density (PSD) profiles corresponding to the plurality of DSLs, wherein each cutoff frequency is based on a target data rate for the corresponding DSL and a plurality of the crosstalk coupling parameters, and for each DSL, adjust a downstream signal power, wherein the downstream signal power on a DSL is based on the determined PSD profile corresponding to the DSL.

In yet another embodiment, the disclosure includes a method implemented in a Spectrum Management Center (SMC) comprising optimizing downstream power backoff (DPBO) parameters of a plurality of cabinet-deployed DSLs based on crosstalk coupling parameters among the cabinet-deployed DSLs, wherein the DPBO parameters include a plurality of cutoff frequencies, each of which corresponds to one of the plurality of DSLs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
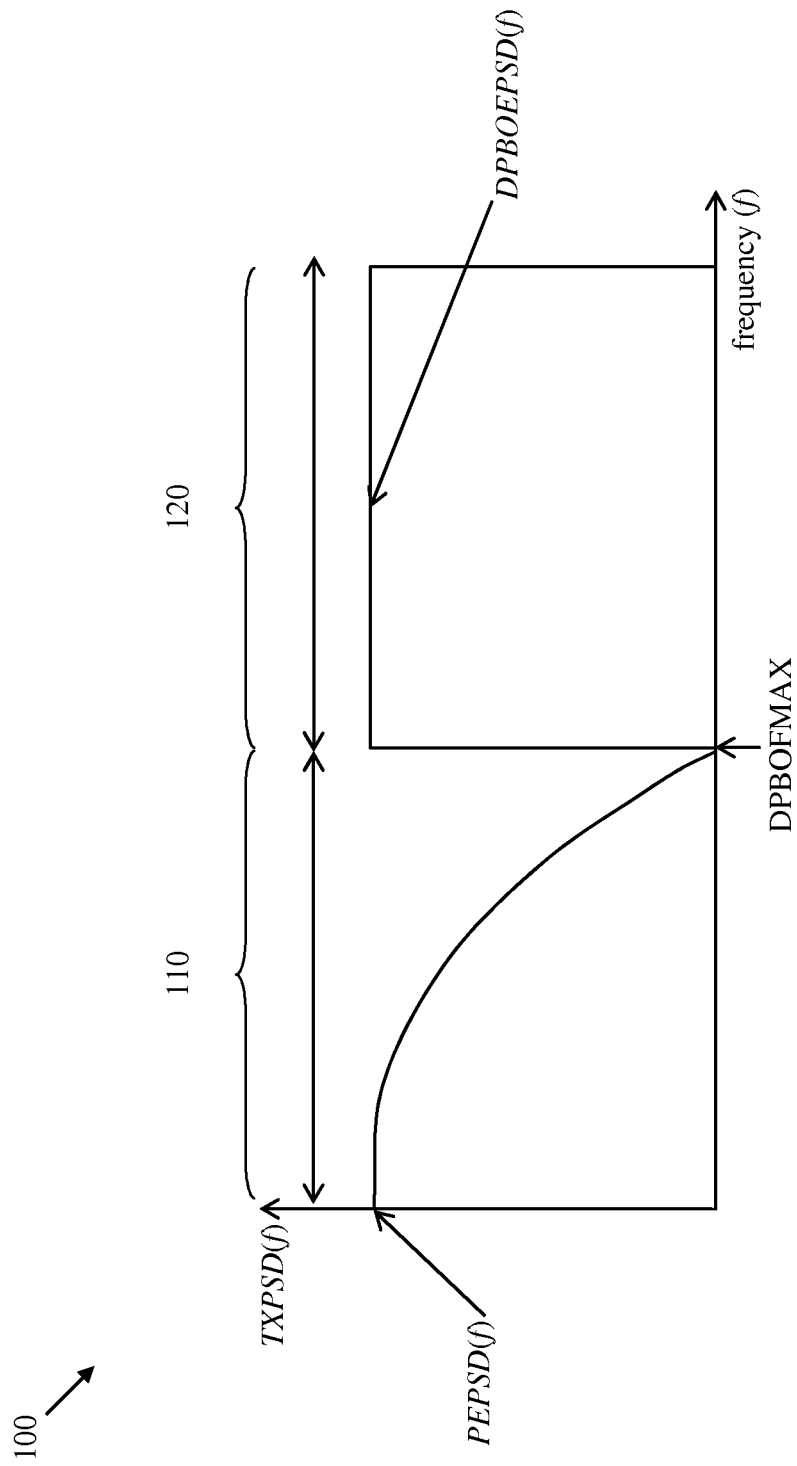
FIG. 1 is a chart of a PSD mask.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In order to reduce crosstalk for downstream transmissions in DSL systems and address potential issues such as the "near-far" problem, a spectrum management technique referred to as downstream power back-off (DPBO) may be used. The DPBO technique may reduce the downstream transmit power spectrum density (PSD) (sometimes referred to as power spectral density) on shorter loops, and thereby reduce the downstream power injected at a flexibility point (e.g., a cabinet). As a result, the downstream FEXT, coupled from the disturbing DSL systems (e.g., cabinet-deployed lines) at the flexibility point into the victim DSL systems (e.g., exchange-deployed lines), may be weakened.

Conventional DPBO is a static spectrum management technique that may be used to reduce crosstalk. However, conventional DPBO may be typically configured to meet a single data-rate requirement. In use, since a plurality of signals may transmit at different rates in different lines, the DPBO may not ensure service requirements (e.g., data-rate or quality of service) for each line. For example, if the DPBO performance is limited to a data-rate that is lower than the rate requirement for a first cabinet-deployed line, adequate service may not be provided over the first line. In comparison, if the supported data-rate is higher than the rate requirement of a second cabinet-deployed line, the DPBO scheme may cause high power consumption and excess crosstalk in the second line. Alternatively, dynamic spectrum management (DSM) techniques may be used to reduce crosstalk and achieve service requirements in a plurality of lines. The DSM techniques may be based on algorithms that optimize the PSD of a transmitter (e.g., a modem), such as iterative waterfilling, iterative spectrum balancing, and optimal spectrum balancing. Disadvantages of such algorithms may include poor performance (e.g., using iterative waterfilling) or relatively high computational complexity (e.g., using iterative spectrum balancing or optimal spectrum balancing), which may lead to implementation difficulties.

An adaptive scheme of DPBO for a single line may overcome the drawbacks of conventional DPBO and/or DSM techniques. The adaptive DPBO scheme attempts to optimize PSD parameters on a line-by-line basis, so that its spectral friendliness may be maximized (minimized crosstalk) while meeting a target data rate. In use, the adaptive DPBO scheme may determine an optimal PSD mask (or profile) based on the current downstream transmit PSD and the required data rate of a line. After an initial optimization, PSD parameters, such as a maximum cutoff frequency of DPBO, may be periodically (but not too frequently) updated in a central office (CO) management information base (MIB). For example, when channel conditions improve (e.g., drop in noise level), the cutoff frequency of DPBO may increase, so that the frequency span of DPBO may be expanded to improve its spectral friendliness. In comparison, when the channel conditions worsen (e.g., rise in noise level), the cutoff frequency may decrease, so that the frequency span of DPBO may be narrowed to maintain the required data rate. The adaptive DPBO scheme for a single line may lead to higher performance than conventional DPBO and/or DSM, and may be implemented using algorithms with relatively lower computational complexity.

In practice, a DBPO scheme (e.g., conventional, DSM, or adaptive) may configure and optimize a PSD mask 100, as illustrated in FIG. 1. The PSD mask 100 may correspond to a configured power vs. frequency profile for a transmitted signal in a subscriber line. The PSD mask 100 may comprise a reduced PSD portion 110 and a maximum PSD portion 120. The reduced PSD portion 110 may correspond to frequencies less than or equal to DPBOFMAX which may be referred to as a maximum DPBO frequency or a cutoff frequency. The transmit PSD (TXPSD(f)) in the reduced PSD portion 110 may decrease as the frequency (f) increases. For example, the TXPSD(f) vs. frequency(f) curve of the reduced PSD portion 110 may comprise a predicted exchange PSD mask (PEPSD (f)), which may be constant over a short frequency range then decrease nonlinearly (or linearly). The function PEPSD(f) may be empirically determined. Generally, as the frequencies increase below the cutoff frequency, the crosstalk in the lines deployed by the exchange and the cabinet may increase. Thus, to reduce the crosstalk, the PSD of the signals transmitted from the cabinet at the higher end of this range (closer to DPBOFMAX) may be decreased and the PSDs of the signals transmitted from the exchange may be maintained.

In contrast, the maximum PSD portion 120 may correspond to frequencies greater than or equal to about DPBOFMAX, where TXPSD(f) may remain constant as the frequency(f) increases. For example, in the TXPSD(f) vs. frequency (f) curve, the maximum PSD portion 120 may be equal to about a DPBO exchange site maximum PSD (DPBOEPSD (f)). At such range above the cutoff, the frequencies may be substantially high and may not be suitable for transmissions over relatively long distances from the exchange to a plurality of customer premise equipments (CPEs) due to, for example, dispersion effects. Consequently, such frequency channels may be dedicated to the lines from the cabinet to the CPEs, which may allow for higher PSDs at a maximum limit, e.g. DPBOEPSD(f). As shown in the PSD mask 200, TXPSD(f) may be expressed mathematically as follows:

$$TXPSD(f) = \begin{cases} PEPSD(f), & f < DPBOFMAX \\ DPBOEPSD(f), & f \geq DPBOFMAX. \end{cases}$$

Further, PEPSD(f) may be expressed as follows:

$$PEPSD(f) = DPBOEPSD(f) - (DPBOESCMA + DPBOESCMB \cdot \sqrt{f} + DPBOESCMC \cdot f) \cdot DPBOESEL,$$

where DPBOESEL may be an electrical loop length of a cable between the exchange and the cabinet, and DPBOESCMA, DPBOESCMB, and DPBOESCMC may be parameters of a frequency response model of the cable. The equation above and at least some of the parameters may be described in the International Telecommunication Union (ITU) Telecommunication Standardization Sector (ITU-T) Recommendation G.997.1 entitled "Physical layer management for digital subscriber line (DSL) transceivers," April 2009, which is incorporated herein by reference.

As mentioned previously, in a conventional DPBO scheme for reducing crosstalk, the cutoff frequency DPBOFMAX may be typically fixed, for example, to about 2.2 Megahertz (MHz). Such a value may be chosen to meet a required data-rate, e.g. equal to about four megabits per second (Mbps) or about five Mbps, in a single line deployed by the cabinet. The PSDs may be configured for a single line that corresponds to that data-rate but not for other lines from the cabinet. A conventional DPBO scheme may be relatively easy to implement and require substantially no or little knowledge about the binder topology of the lines (e.g., only the distance between the exchange and the cabinet). However, such scheme may not meet the multiple data-rate requirements at the cabinet. For example, if the data-rate supported using the optimized PSD is lower than the required data rate for a line, the line may not provide adequate service. Alternatively, if the supported data-rate is higher than the required data rate for a line, additional power may be unnecessarily consumed and crosstalk may be increased in the line.

To optimize the PSDs for a plurality of lines deployed from the cabinet, the total transmitted signal power in the lines may be configured using a DSM technique. Using DSM, the PSDs may be set based on the binder topology (e.g., the length of the different lines and cabinet location) and on the required rates of the lines. The DSM technique may be based on any of a number of DSM algorithms, such as iterative waterfilling, optical spectrum balancing, or iterative spectrum balancing. The iterative waterfilling algorithm may not require knowledge of the binder topology, but may yield poor performance in a mixed exchange/cabinet deployment scenario. The optical spectrum balancing and iterative spectrum balancing algorithms may yield optimal or near-optimal performance, but may require a centralized control. Additionally, such algorithms may be relatively more complex and difficult to implement, for example, when the quantity of lines in the network is relatively high. Further, the PSD masks resulted from DSM techniques may sometimes contain steep regions which may not be compliant with existing standards.

An adaptive scheme may be used instead of the conventional DPBO and DSM schemes to improve the PSD configuration and optimization and achieve reduced crosstalk. In the adaptive scheme, the cutoff frequency DPBOFMAX in the PSD mask may vary for each line depending on the required data-rates of the lines. For example, the PSDs of the lines that have different data-rates may be configured using PSD masks based on different DPBOFMAX values. The PSD values in the PSD masks may be configured to reduce the crosstalk between the lines, and the DPBOFMAX values in the PSD masks may be selected to optimize the PSDs to meet the required data-rates of the lines. As such, the adaptive scheme may be implemented to minimize or reduce the crosstalk and the power consumption in the lines, while meeting the service requirements of the lines. The adaptive scheme may be based on DPBO, and may be simpler to implement in comparison to a DSM technique. For example, the adaptive scheme may require the distance between the exchange and the cabinet, but not the knowledge of other binder topology. Additionally, the adaptive scheme may have less stringent memory requirements in comparison to the DSM technique.

Figure 2:
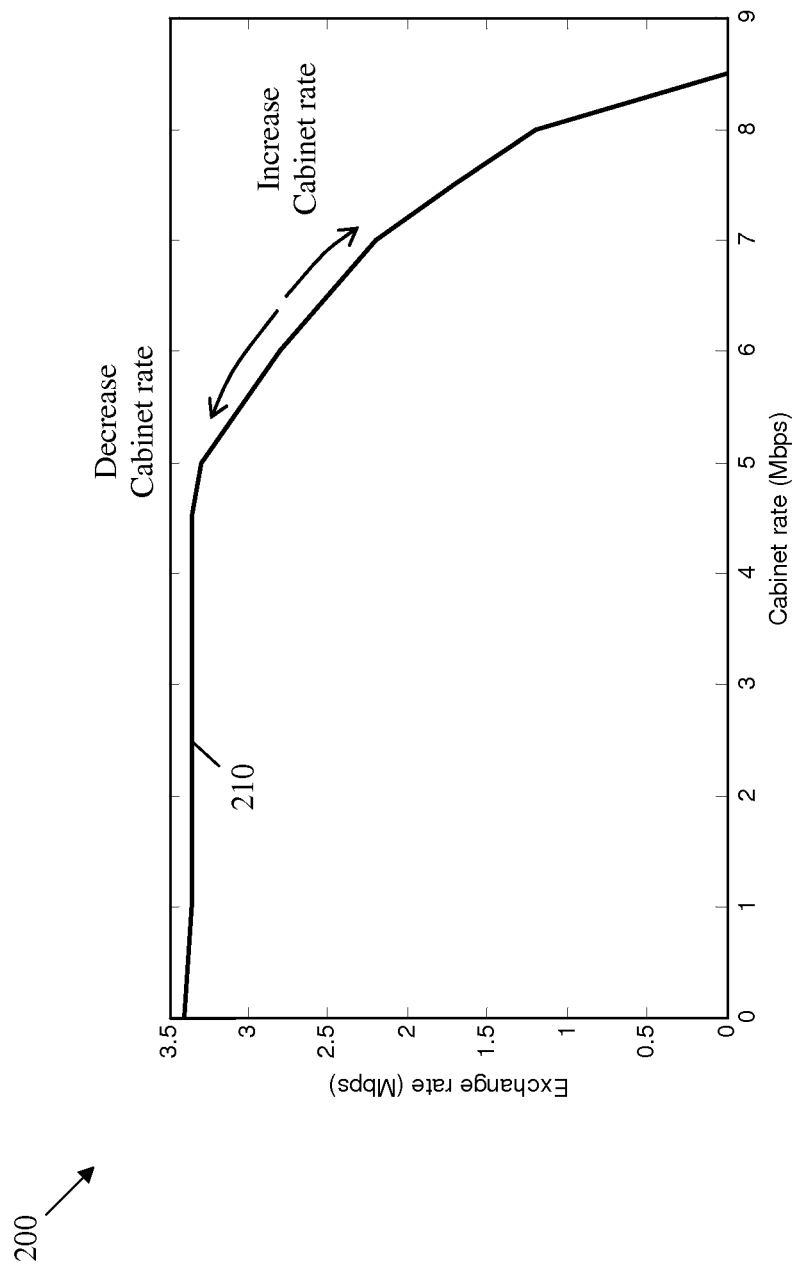
FIG. 2 is a chart of an exchange/cabinet rate tradeoff.

FIG. 2 illustrates a chart of an exchange/cabinet rate tradeoff 200 between a plurality of exchange and cabinet-deployed lines. The exchange/cabinet rate tradeoff 200 may be represented by a curve 210 that comprises a plurality of points. The curve 210 represents exchange rate and cabinet rate pairs configured using a conventional DPBO scheme. The points correspond to a compromise between exchange rate and cabinet rate pairs to limit crosstalk in the lines. Accordingly, when the frequency channels in the exchange-deployed lines and the exchange rates are increased, the frequency channels in the cabinet-deployed lines and the cabinet rates may be decreased to reduce the crosstalk. For example, when the exchange rate in an exchange-deployed line for a first CPE is relatively low (e.g., equal to about one Mbps), the cabinet rate in a cabinet-deployed line for the first CPE may be relatively high (e.g., equal to about eight Mbps). In comparison, when the exchange rate for a second CPE is higher (e.g., equal to about three Mbps), the cabinet rate for the second CPE may be lower (e.g., equal to about 5.5 Mbps).

Using a conventional DPBO, the configured PSDs may meet a data-rate requirement in a single line, which may correspond to a single point on the curve 210. In contrast, the adaptive scheme may be used to optimize the PSDs to reduce crosstalk and meet a plurality of data-rates in a plurality of lines, which may correspond to a plurality of points on the curve 210. The adaptive scheme may be used by varying the value of DPBOFMAX to match the data-rates in the lines. For example, the DPBOFMAX value may be reduced for higher cabinet rates (on the right side of the curve 210) or may be increased for lower cabinet rates (on the left side of the curve 210). Thus, the PSDs may be optimized according to the required data-rates in the cabinet-deployed lines and the data-rates in the exchange-deployed lines may be maintained.

Figure 3:
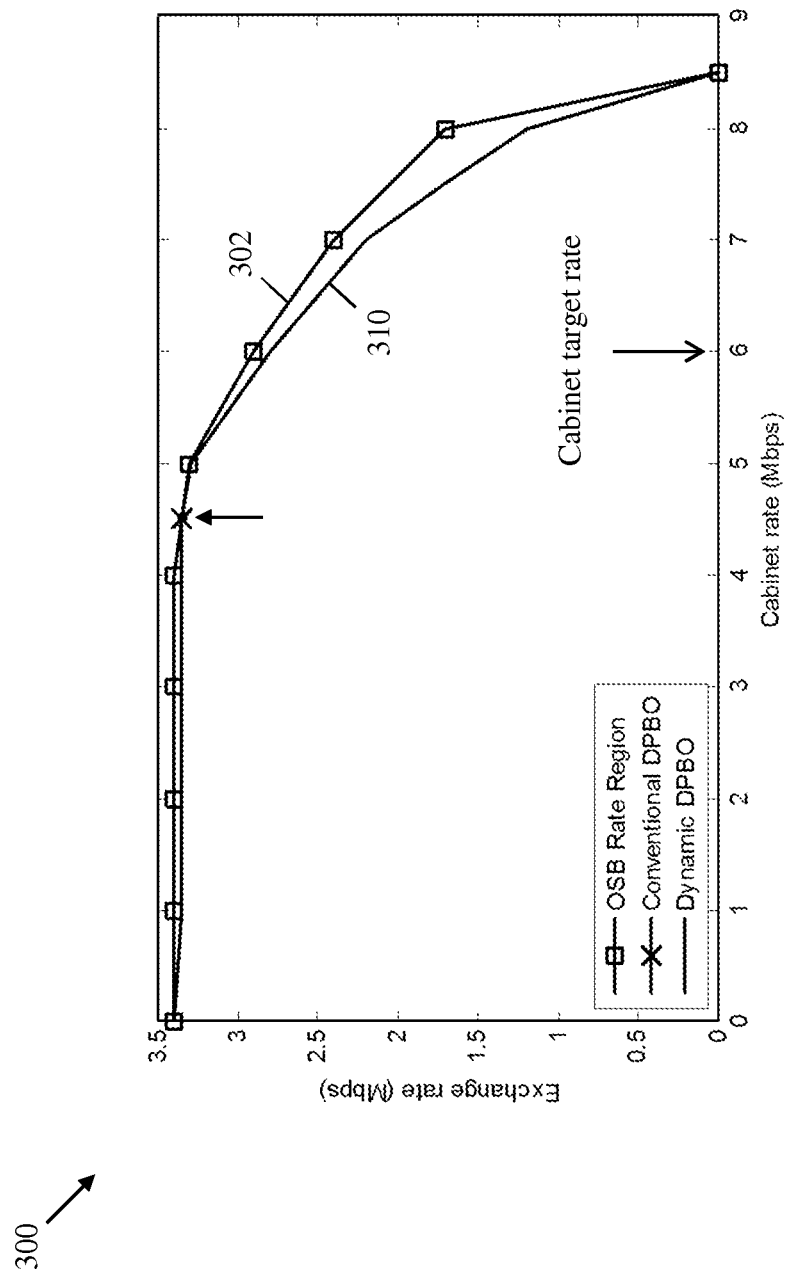
FIG. 3 is a chart of an exchange/cabinet rate optimization.

FIG. 3 illustrates a chart of an exchange/cabinet rate optimization 300 between a plurality of exchange and cabinet-deployed lines. The exchange/cabinet rate optimization 300 may be represented by a curve 302 that comprises a plurality of points. The points correspond to exchange rate and cabinet rate pairs in the lines, where the PSDs have been optimized. Suppose, for the purpose of illustration, that the points correspond to eight exchange-deployed lines that have a distance equal to about five kilometers (km) and eight cabinet-deployed lines that have a distance equal to about three km. The cabinet is located at about four km from the exchange. Accordingly, the PSDs may be optimized using the adaptive scheme described above by varying the cutoff frequency to match the data-rates in the lines. For example, to optimize the PSDs for the higher cabinet rates in the curve 302, the adaptive scheme may be used to reduce the DPBOFMAX value. Alternatively, to optimize the PSDs of the lower cabinet rates, the DPBOFMAX value may be increased.

The curve 302 may be compared to a curve 310 that represents exchange rate and cabinet rate pairs configured using a conventional DPBO scheme, e.g. similar to the curve 310. Unlike the curve 302, the curve 310 may meet data-rate requirements for a single exchange rate and cabinet rate pair (denoted by "x"), which corresponds to the conventional DPBO scheme (e.g., at about 2.2 MHz). The supported exchange rate and cabinet rate pair on the curve 310 may match another point on the curve 302, which corresponds to an optimized PSD using the adaptive scheme. However, the remaining points on the curve 310 may not meet the data-rate requirements for other exchange rate and cabinet rate pairs. Consequently, a cabinet target rate equal to about six Mbps (indicated by an arrow) may be supported using the adaptive scheme but not the conventional DPBO scheme.

Although the adaptive DPBO scheme described above may yield lower complexity and higher performance over the conventional and/or DSM schemes, it may still hold certain drawbacks. For example, when configuring the transmit PSDs of a plurality of DSL systems to their respective optimal conditions, the convergence of optimal PSDs may be slow, due to a lack of coordination among the plurality of DSL systems. Since the adaptive algorithm is per line based, each line may run the algorithm autonomously and optimize its own parameters (e.g., DPBOFMAX of the PSD mask 100). Consequently, it is possible that, when one line has already converged to an optimal DPBOFMAX, other lines may still have yet to finish the optimization process. Thus, the total convergence time may be prolonged. Further, since the adaptive DPBO scheme for a first line may not take into account the influences of other lines (e.g., in the same binder), the optimized PSD for the first line may be subject to deterioration and/or instability. For example, the crosstalk coupling among the plurality of lines may change periodically, which may affect the first line that just finished optimizing its PSD. Due to the changing crosstalk interference from other lines into the first line, the once optimal PSD may become suboptimal. Consequently, the optimization process may have to be performed again, which may take many reinitiations and iterations. Sometimes dramatic changes in the PSDs of the other lines may even cause the condition of the optimized first line to become unstable because of retrains or reinitializations.

Disclosed herein is a system and method for joint optimization of a plurality of downstream transmit PSDs corresponding to a plurality of subscriber lines. The method may comprise an adaptive DPBO scheme to reduce the crosstalk among the lines and meet the service requirements of the lines, such as data-rates for providing adequate services. For each line, the PSD of the transmitted signals in the line may be configured and optimized using an algorithm based on a cutoff frequency of a PSD mask. The cutoff frequency may vary line-by-line according to the required data-rates. In the disclosed system and method, the joint optimization of the cutoff frequencies may take into account not only the required data rate of a line, but also the influence of the conditions of other lines in the bundle. Therefore, the coordinated algorithm may obtain fast convergence of optimal PSDs for the plurality of lines. The method may be relatively simple to implement and may lead to a higher performance of the overall DSL network than the conventional and/or DSM algorithms.

Figure 4:
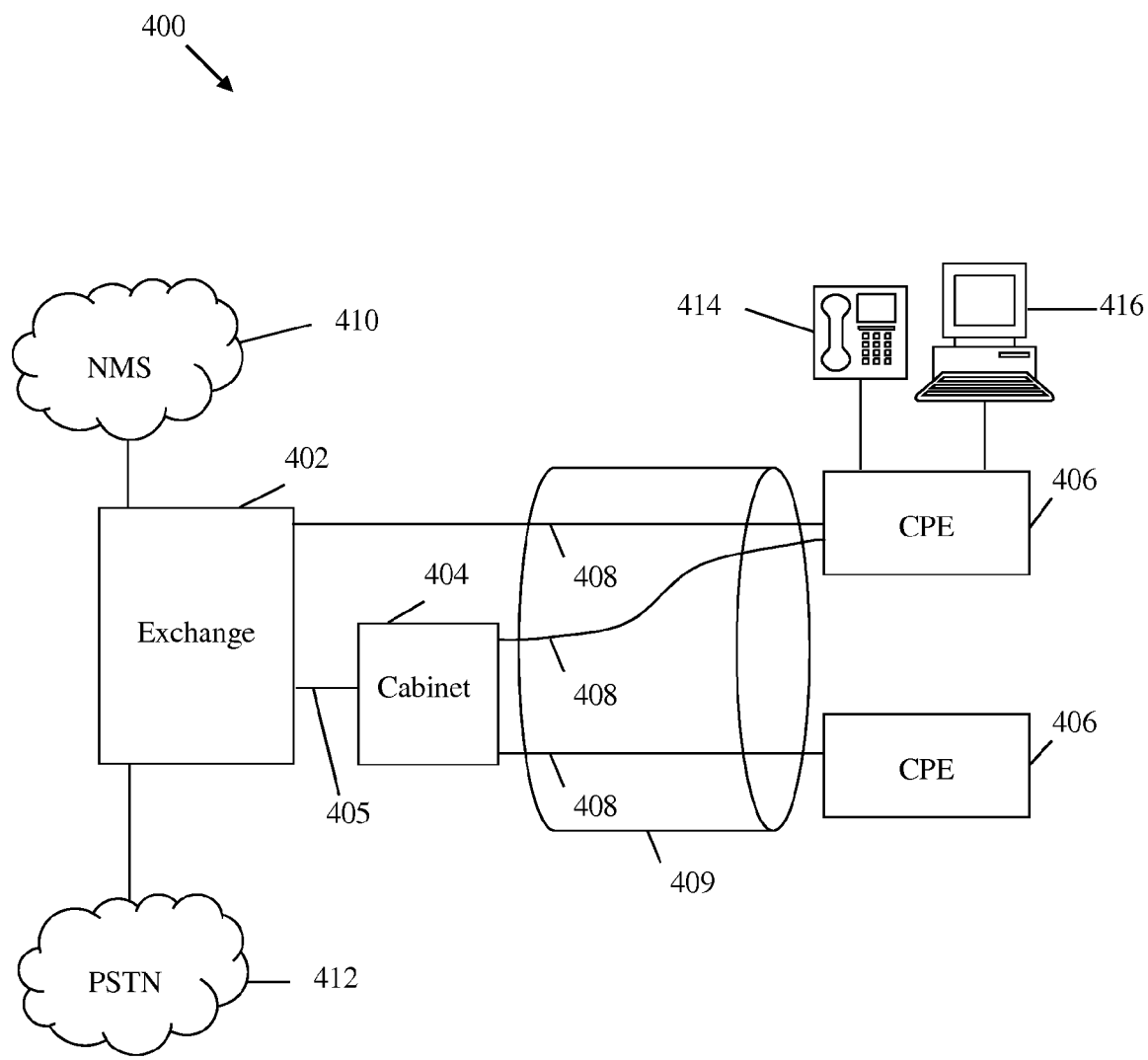
FIG. 4 is a schematic diagram of an embodiment of a DSL system.

FIG. 4 illustrates a schematic diagram of an embodiment of a DSL system 400. The DSL system 400 may be a VDSL2 system, an ADSL2 system, an ADSL2 plus (ADSL2+) system, or any other DSL system. The DSL system 400 may comprise an exchange 402, a cabinet 404 coupled to the exchange 402 by a cable 405, and a plurality of CPEs 406, which may be coupled to the exchange 402 and/or the cabinet 404 via a plurality of subscriber lines 408. At least some of the subscriber lines 408 may be bundled in a binder 409. Additionally, the DSL system 400 may optionally comprise a network management system (NMS) 410 and a public switched telephone network (PSTN) 412, both of which may be coupled to the exchange 402. In other embodiments, the DSL system 400 may be modified to include splitters, filters, management entities, and various other hardware, software, and functionality.

The NMS 410 may be a network management infrastructure that processes data exchanged with the exchange 402 and may be coupled to one or more broadband networks, such as the Internet. The PSTN 412 may be a network that generates, processes, and receives voice or other voice-band signals. In an embodiment, the exchange 402 may be a server located at a CO and may comprise switches and/or splitters, which may couple the NMS 410, the PSTN 412, and the subscriber lines 408. For instance, the splitter may be a 2:1 coupler that forwards data signals received from the subscriber lines 408 to the NMS 410 and the PSTN 412, and forwards data signals received from the NMS 410 and the PSTN 412 to the subscriber lines 408. Further, the splitter may optionally comprise one or more filters to help direct data signals between the NMS 410, the PSTN 412, and the subscriber line 408. Additionally, the exchange 402 may comprise at least one DSL transmitter/receiver (transceiver), which may exchange signals between the NMS 410, the PSTN 412, and the subscriber lines 408. The signals may be received and transmitted using the DSL transceiver, such as a modem. In an embodiment, the DSL transceiver may comprise a forward error correction (FEC) codeword generator that generates FEC data, an interleaver that interleaves the transmitted data across a plurality of tones, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the exchange 402 may be configured to transmit data at similar or different rates for each subscriber line 408.

In an embodiment, the cabinet 404 may be located at a distribution center between the CO and customer premises and may comprise switches and/or splitters, which may couple the exchange 402 to the CPEs 406. For instance, the cabinet 404 may comprise a DSL access multiplexer (DSLAM) that couples the exchange 402 to the CPEs 406. Additionally, the cabinet 404 may comprise a DSL transceiver, which may be used to exchange signals between the exchange 402 and the CPEs 406. The DSL transceiver may process the received signals or may simply pass the received signals between the CPEs 406 and the exchange 402. The splitter in the cabinet 404 may be a N:1 coupler (where N is an integer) that routes data signals received from the exchange 402 to N CPEs 406, and routes data signals received from the N CPEs 406 to the exchange 402. The data signals may be transmitted and received using the DSL transceiver. Further, the splitter of the cabinet 404 may optionally comprise one or more filters to help direct data signals between the exchange 402 and the CPEs 406 via the corresponding subscriber lines 408. In an embodiment, the DSL transceiver may be configured to transmit data to the CPEs 406 at similar or different rates and/or power for each subscriber line 408, as described in detail below. The cabinet 404 may also be referred to herein as remote terminal (RT) interchangeably.

In an embodiment, the CPEs 406 may be located at the customer premises, where at least some of the CPEs 406 may be coupled to a telephone 414 and/or a computer 416. The telephone 414 may be hardware, software, firmware, or combinations thereof that generates, processes, and receives voice or other voice-band signals. The CPE 406 may comprise a switch and/or a splitter, which may couple the subscriber lines 408 and the telephone 414 and the computer 416. The CPE 406 may also comprise a DSL transceiver to exchange data between the CPE 406 and the exchange 402 via the subscriber line 408. For instance, the splitter may be a 2:1 coupler that forwards data signals received from the subscriber line 408 to the telephone 414 and the DSL transceiver, and forwards data signals received from the telephone 414 and the DSL transceiver to the subscriber line 408. The splitter may optionally comprise one or more filters to help direct data signals to and from the telephone 414 and the DSL transceiver. The DSL transceiver (e.g., a modem), may transmit and receive signals through the subscriber lines 408. For instance, the DSL transceiver may process the received signals to obtain the transmitted data from the exchange 402, and pass the received data to the telephone 414, the computer 416, or both. The CPEs 406 may be coupled to the exchange 402 directly via the subscriber lines 408 and/or via the subscriber lines 408 and the cabinet 404. For example any of the CPEs 406 may be coupled to a subscriber line 408 from the exchange 402 and/or a subscriber line 408 from the cabinet 404. The CPEs 406 may access the NMS 410, the PSTN 412, and/or other coupled networks via the subscriber lines 408 deployed by the exchange 402 and/or the cabinet 404.

In an embodiment, the subscriber lines 408 may be telecommunications paths between the exchange 402 and the CPE 406 and/or between the cabinet 404 and the CPEs 406, and may comprise one or more twisted-pairs of copper cable. Crosstalk interference may occur between the tones or signals transported through the subscriber lines 408 that are deployed by the exchange 402 and the cabinet 404, e.g. in the binder 409. The crosstalk interference may be related to the power, frequency, and travel distance of the transmitted signals and may limit the communications performance in the network. For instance, when the PSD of the transmitted signals increase, e.g. over a range of frequencies, the crosstalk between the adjacent subscriber lines 108 may increase and hence the data-rates may decrease. To reduce or limit the crosstalk in the lines, the DSL transceiver of the cabinet 404 may be configured to control and adjust the PSD of the signals or tones transmitted downstream, e.g. to the CPEs 406, in any of the subscriber lines 408. The DSL transceiver may be used to reduce the PSD of a transmitted signal in a line to ensure a sufficient data-rate that meets service requirements. The PSD may be controlled, e.g. using software, hardware, firmware, or combinations thereof, according to a PSD profile or mask to reduce crosstalk. The PSD mask may be optimized to meet the service requirements for any of the lines, such as the data-rate in the subscriber line 408.

In a joint adaptive DPBO scheme for a plurality of subscriber lines (e.g., deployed from a cabinet), the issues of slow convergence and potential instability may be eliminated or minimized via coordination of the plurality of lines. For example, DPBO parameters (e.g., DPBOFMAX of the PSD mask 100) for a line may be optimized by not only considering the required data-rate of the line itself, but also considering the PSDs of other lines and the crosstalk coupling information among the plurality of lines. As a result, the convergence of optimal PSDs for the plurality of lines may be made faster, since fewer iterations or retrainings may be needed. Further, the overall conditions of the plurality of lines may be made more stable.

There may be a variety of algorithms to implement the joint optimization DBPO scheme. In an embodiment, a DPBOF-MAX value for each line may be calculated based on an algorithm that may be implemented using hardware, software, firmware, or combinations thereof. For example, the algorithm may be implemented at a cabinet (e.g., a DSLAM) or in a network management system which comprises a local spectrum management center (SMC). The algorithm may configure a plurality of PSD masks (e.g., PSD mask 200) corresponding to a plurality of subscriber lines. An embodiment of an algorithm is presented in pseudo code in Table 1, where:

N may refer to the total number of subscriber lines to configure PSD masks;
K may refer to the total number of subcarriers;
$\forall n$ denotes "for all n" or for $n=1, 2, \ldots, N$;
$\forall k$ denotes "for all k" or for $k=1, 2, \ldots, K$;
$DPBOFMAX_{min}^n$ may refer to the minimum allowed value of the cutoff frequency DPBOFMAX for line n;
$DPBOFMAX_{max}^n$ may refer to the maximum allowed value of DPBOFMAX for line n;
$DPBOFMAX_{tol}^n$ may refer to the tolerance (i.e. smallest step or resolution) of iteration of DPBOFMAX for line n;
$f_k$ may refer to the center frequency of subcarrier k;
$f_s$ may refer to the DMT symbol rate;
$b_{max}$ may refer to the maximum allowed number of bits per subcarrier;
$s_k^n$ may refer to the transmit PSD of line n on subcarrier k;
$s_k^m$ may refer to the transmit PSD of line m on subcarrier k;
$h_k^{n,m}$ may refer to the crosstalk coupling function from line m (disturbing line) into line n (victim line) on subcarrier k.
$h_k^{n,n}$ may refer to the gain of line n on subcarrier k.
$\sigma_k^n$ may refer to the power of background noise of line n on subcarrier k (e.g., due to thermal noise);
$R_{target}^n$ may refer to the required (or target) data rate for line n;
$R^n$ may refer to the current or intermediate data rate for line n; and
$\Gamma$ may refer to the Signal to Noise Ratio (SNR) gap to capacity.

TABLE 1 an adaptive DPBO algorithm for N subscriber lines.

Initialize $DPBOFMAX_{tol}^n$, $DPBOFMAX_{min}^n$, and $DPBOFMAX_{max}^n$ $\forall n$
Repeat until $DPBOFMAX_{max}^n - DPBOFMAX_{min}^n \leq DPBOFMAX_{tol}^n$, $\forall n$
  for n = 1:N TABLE 1-continued an adaptive DPBO algorithm for N subscriber lines.

if $DPBOFMAX_{max}^n - DPBOFMAX_{min}^n > DPBOFMAX_{tol}^n$ $$DPBOFMAX^n = \frac{DPBOFMAX_{min}^n + DPBOFMAX_{max}^n}{2}$$

$$s_k^n = \begin{cases} PEPSD^n(f_k) & \text{if } f_k < DPBOFMAX^n \\ DPBOEPSD^n(f_k) & \text{if } f_k \geq DPBOFMAX^n \end{cases} \forall k$$

$$R^n = f_s \sum_k \min\left(b_{max}, \log_2\left(1 + \frac{1}{\Gamma} \frac{|h_k^{n,n}|^2 s_k^n}{\sum_{m \neq n} |h_k^{n,m}|^2 s_k^m + \sigma_k^n}\right)\right)$$

if $R^n \geq R_{target}^n$
        $DPBOFMAX_{min}^n = DPBOFMAX^n$
      else
        $DPBOFMAX_{max}^n = DPBOFMAX^n$
      end
    end
  end
end In the implementation of the above algorithm, as illustrated in Table 1, the final value of $DPBOFMAX^n$ may be referred to as the cutoff frequency for line n. The transmit PSD for line n may be given by:

$$TXPSD^n(f) = \begin{cases} PEPSD(f), & f < DPBOFMAX^n \\ DPBOEPSD(f), & f \geq DPBOFMAX^n \end{cases}$$

The search range of the parameter DPBOFMAX for each of the plurality of lines may be decreased iteratively. For example, in each iteration, the algorithm may first reduce the search range of DPBOFMAX for line one by a half while keeping DPBOFMAX for all other lines and their transmit PSDs fixed. Then, the algorithm may reduce the search range of DPBOFMAX for line two by a half while keeping DPBO-FMAX for all other lines and their transmit PSDs fixed. The same process may be repeated until all lines are covered. After the search ranges of DPBOFMAX for all lines are reduced by half, the algorithm may enter a next iteration. Such an iterative process may be guaranteed to converge, because each iteration reduces the search range of the parameter DPBOF-MAX by a half via a bisection search. The iterative process may stop, after the search range of DPBOFMAX for each of the plurality of lines has been reduced to a pre-set tolerance frequency range. The iterative process may produce cutoff frequencies for each of the N lines.

The complexity of the adaptive DPBO algorithm is $O(K \times \log_2(K))$ per line, where K is the number of subcarriers in a MEDLEY set. The MEDLEY set may refer to a set of subcarriers used during the DSL initialization and may be defined in various ITU recommendations. Since the complexity may be linear with the number of subscriber lines, the disclosed algorithm may be relatively simple to implement in a network comprising a large number of lines (e.g., several thousand or more lines). For example, in some applications, the number of subcarriers may be approximately 4000, and the number of lines N may be in the thousands. Compared with some conventional DPBO and/or DSM algorithms whose complexity may be exponential with the number of lines and thus relatively difficult to implement in a network comprising a large number of lines, the low complexity of the disclosed algorithm may prove advantageous.

In the joint optimization of cutoff frequencies for the plurality of DSLs, various parameters, such as crosstalk coupling functions among all lines (e.g., $h_k^{n,m}$ for all k, n and m (m≠n) in the algorithm in Table 1), gains (e.g., $h_k^{n,n}$ for all k and n), and background noises (e.g., $\sigma_k^n$ for all k and n), may be determined before an execution of the algorithm. Also, initial values of $s_k^n$ for all k and for n=2, 3, ... N may be determined before the start of the algorithm. Then, in each iteration step, the search range of the cutoff frequency DPBOFMAX for each line may be reduced based on comparison of a derived current data rate (e.g., $R^n$ for all n) and a target data rate of the line (e.g., $R_{target}^n$ for all n). If the derived current data rate is higher than the target data rate, the DPBOFMAX may only be searched in the upper half of its previous range. Otherwise, if the derived current data rate is lower than the target data rate, the DPBOFMAX may only be searched in the lower half of its previous range.

Further, the derivation of the current data rate for a given line may take into account, not only its own parameters, but also the parameters of other lines. These considered parameters may include transmit PSDs and crosstalk coupling functions among all lines. For example, the computation of $R^n$ in the algorithm of Table 1 for a given line n incorporates the terms $h_k^{n,m}$, $s_k^n$ for all k, n and m (m≠n), thus taking into account crosstalk coupling and PSDs for other lines. These parameters may be assumed to be constant throughout all iteration steps, or they may be updated during each iteration step. Consequently, the final DPBOFMAX for a line may be the result of a joint (and iterative) optimization based on the conditions of all lines. When the conditions of other lines change (e.g. increase in crosstalk coupling), jointly optimized DPBOFMAX may be adjusted accordingly to maintain optimal or near-optimal PSD. As a result, the plurality of lines may obtain maximum spectral friendliness, while meeting their target data rates. The coordination among the lines may lead to an overall higher performance as well as increased stability of the DSL network.

In an embodiment, a variety of events may trigger the execution of the algorithm shown in Table 1. Examples of the triggering events may include, but are not limited to, the addition of a new line to an existing bundle of lines, the reinitiation of an active line in the bundle, and changes in the background noise for some of the lines. In addition, the DPBOFMAX value for the plurality of lines may be varied, e.g. in a dynamic manner, to maintain the required data rates of the lines over a time period or a showtime. In some cases, regulatory constraints may limit the minimum and/or maximum value allowed for the cutoff frequency DPBOFMAX. Such constraint may be incorporated in the adaptive scheme for reducing crosstalk, for example, by manually setting $DPBOFMAX_{min}^n$ in the algorithm above to a minimum value that is allowed for DPBOFMAX for line n.

Figure 5A:
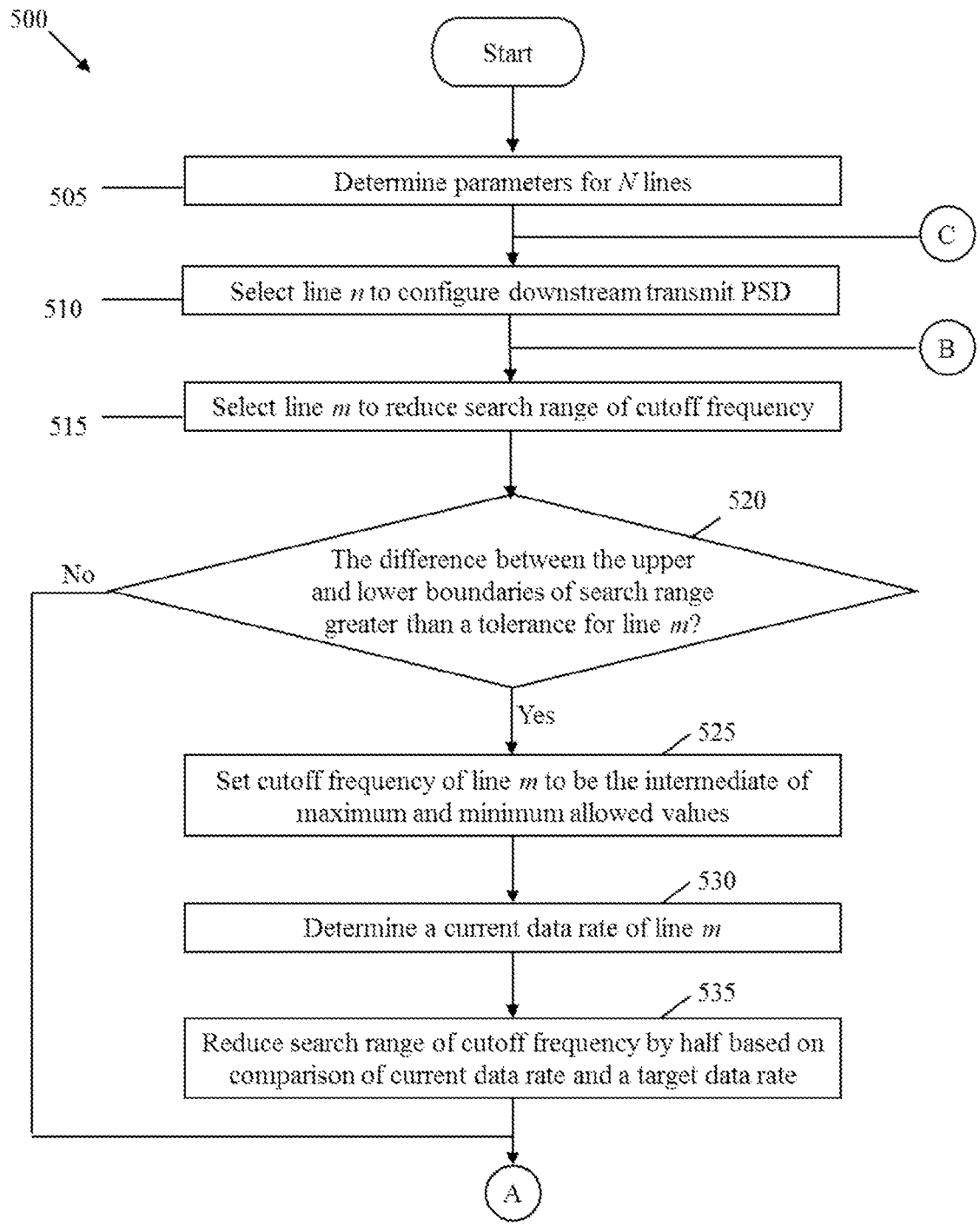
FIG. 5a and FIG. 5b are flowcharts of an embodiment of a joint and iterative PSD optimization method.
Figure 5B:
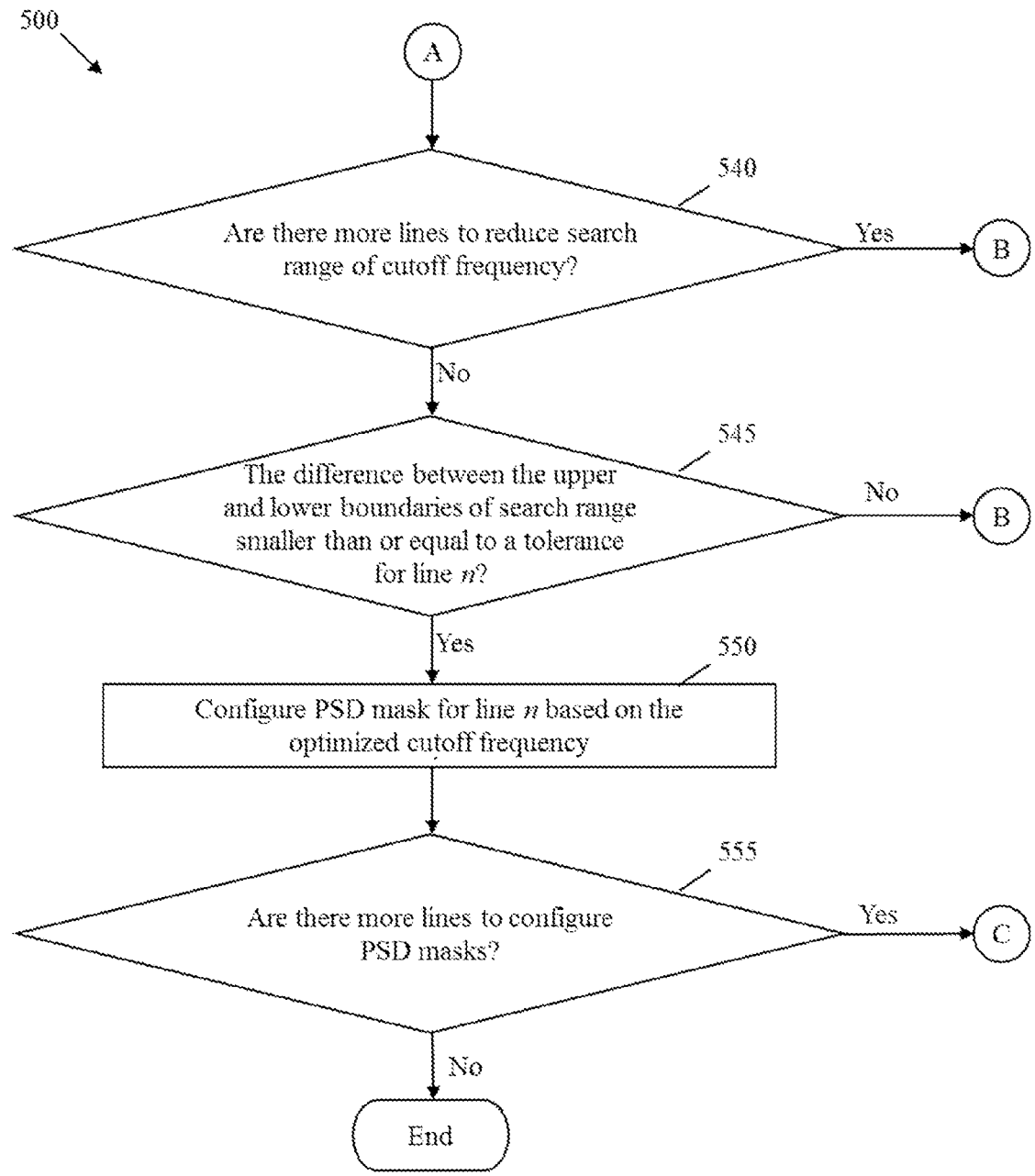

FIG. 5a and FIG. 5b illustrate two flowcharts of an embodiment of a joint and iterative PSD optimization method 500, which may be used to configure a plurality of PSD masks corresponding to a plurality of cabinet-deployed lines in an architecture such as the DSL system 400 in FIG. 4. The method 500 may configure cutoff frequencies of the PSD masks in order to optimize the downstream transmit PSDs. The optimized PSDs may reduce crosstalk among the lines while meeting their required data rates in the lines. The reduction in crosstalk may also avoid or limit unnecessary power consumption in the lines.

The method 500 may start in step 505, where a variety of parameters pertaining to a plurality of lines (e.g., N lines where N is an integer greater than one) may be determined. The variety of parameters may be determined via any suitable known technique or approach. For example, the parameters may be determined through measurement, estimation, derivation, or any combinations thereof. The parameters may include, but are not limited to, crosstalk coupling functions or parameters (e.g., $h_k^{n,m}$ for all k, n and m (m≠n) in the algorithm of Table 1) among all lines, gains (e.g., $h_k^{n,n}$ for all k and n), and background noises (e.g., $\sigma_k^n$ for all k and n) of all lines. The parameters may be assumed to remain constant during an implementation of the method 500. Alternatively, if desired, the parameters may be updated during an implementation of the method 500. Further, step 505 may also set various initial parameters for each line (e.g., line n), such as a maximum allowed cutoff frequency $DPBOFMAX_{max}^n$, a minimum allowed cutoff frequency $DPBOFMAX_{min}^n$, and an iteration tolerance $DPBOFMAX_{tol}^n$.

Next, in step 510, a line (e.g., line n) may be selected from the N lines to configure its transmit PSD profile (or mask). The selected line n may be any line in a bundle, not necessarily starting from the first line. The PSD profiles of all N lines may be configured in the method 500. Alternatively, depending on application, only a subset of lines may be configured while still using parameters pertaining to all N lines.

Next, the method 500 may enter an iterative process to optimize a cutoff frequency for the selected line n. An iterative process may comprise one or more iteration sequences, and an iteration sequence comprise a plurality of steps in the method 500. An iteration sequence may start in step 515, where a line (e.g., line m) may be selected from the N lines to reduce the search range of its corresponding cutoff frequency. It should be understood that, in each iteration sequence, the method 500 may actually reduce the search ranges of cutoff frequencies corresponding to all N lines by half. Therefore, the line m selected in step 515 may be independent from the line n selected in step 510.

Next, the iteration sequence may continue in step 520, where the method 500 may determine if the difference between an upper boundary and a lower boundary of the search range is greater than the iteration tolerance, which is set in step 505. The upper and lower boundaries of the search range of the cutoff frequency may be initially set to be the maximum and minimum allowed cutoff frequencies for the line m (selected in step 515), respectively. Then, in each iteration sequence, the search range may be reduced by a half. If the condition in step 520 is met, the method 500 may proceed to step 525. Otherwise, the method 500 may proceed to step 540. In step 525, the cutoff frequency of the line m may be set to the intermediate (or average) of the upper and lower boundaries of the search range.

Next, in step 530, a current data rate of the line m may be determined. It should be noted that the current data rate may be determined jointly based on not only parameters of the line m, but also parameters of all other N−1 lines in a binder. For example, parameters such as transmit PSDs, crosstalk coupling functions, gains, and background noises may be accounted in the determination of the current data rate. Among the accounted parameters, the transmit PSD for the line m may be derived from the cutoff frequency set in step 525, and the transmit PSDs for all other N−1 lines may be assumed to be fixed for the current iteration sequence. The joint determination of the current data rate may take into account the varying conditions of other lines, thus leading to a more accurate and improved determination.

Next, in step 535, the search range of the cutoff frequency DPBOFMAX for the line m may be reduced by half based on comparison of the current data rate and a target data rate. For example, if the derived current data rate is higher than the target data rate, the DPBOFMAX may only be searched in the upper half of its previous range. Otherwise, if the derived current data rate is lower than the target data rate, the DPBOFMAX may only be searched in the lower half of its previous range.

Next, in step 540, the method 500 may determine if there are more lines to reduce the search range of its cutoff frequency. As mentioned above, in each iteration sequence, the method 500 may actually reduce the search ranges of all cutoff frequencies corresponding to all N lines by half. If the condition in the block 540 is met, the method 500 may return to step 520 to reduce the search ranges of cutoff frequencies for the remaining lines in the binder. Otherwise, the method 500 may conclude that all search ranges are reduced by half and the current iteration sequence is over. Thus, the method 500 may proceed to step 545.

In step 545, the method 500 may determine if additional iteration sequences are needed to optimize the cutoff frequency for the line n selected in step 510. This may be achieve by calculating the difference between the (reduced) upper and lower boundaries of the search range and seeing if it is smaller than or equal to the iteration tolerance. If the condition in the block 545 is met, the method 500 may deem that the cutoff frequency for the line n is already sufficiently optimized, and thus proceed to step 550. Otherwise, the method 500 may return to step 515 to enter a next iteration sequence, where the search ranges of cutoff frequencies for all N lines may be further reduced by half. Next, in step 550, the PSD mask for line n may be configured based on the optimized cutoff frequency, and an optimal transmit PSD may be determined accordingly. Next, in step 555, the method 500 may determine if there are more lines to configure PSD masks. If the condition in the block 555 is met, the method 500 may return to step 510 to configure PSD masks for the remaining lines in the binder. Otherwise, the method 500 may end.

Figure 6:
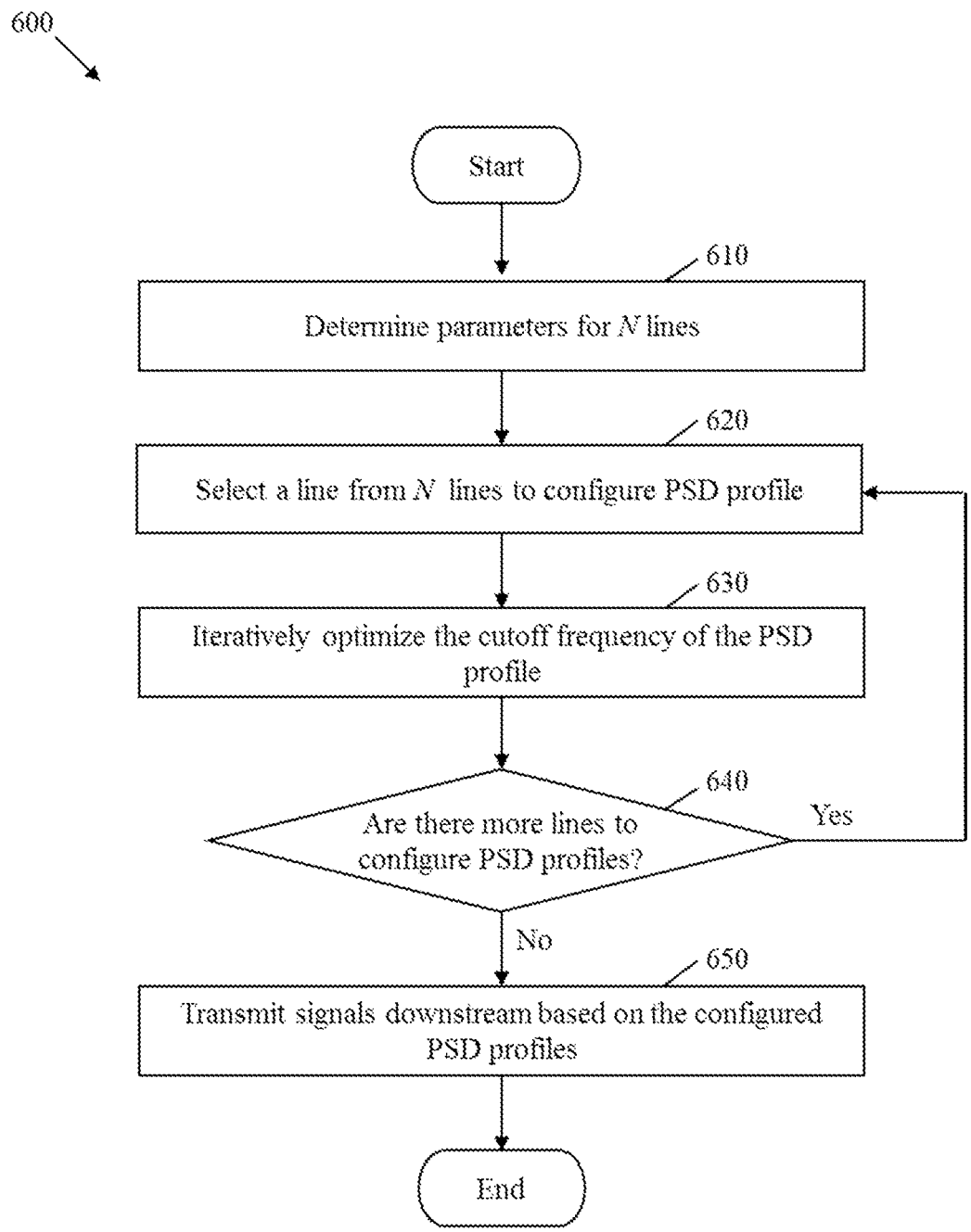
FIG. 6 is a flowchart of an embodiment of a joint and iterative PSD optimization method.

The joint and iterative DPBO scheme disclosed herein may also be illustrated in a relatively simpler layout. FIG. 6 shows a flow chart of an embodiment of a joint and iterative PSD optimization method 600, which may be used to configure a plurality of PSD masks corresponding to a plurality of cabinet-deployed lines in an architecture such as the DSL system 100 in FIG. 4. The method 600 may configure cutoff frequencies of the PSD masks in order to optimize the downstream transmit PSDs. The optimized PSDs may reduce crosstalk among the lines while meeting their required data rates in the lines. The reduction in crosstalk may also avoid or limit unnecessary power consumption in the lines.

The method 600 may start in step 610, where a variety of parameters pertaining to a plurality of lines (e.g., N lines where N is an integer greater than one) may be determined. The variety of parameters may be determined via any suitable known technique or approach. For example, the parameters may be determined through measurement, estimation, derivation, or any combinations thereof. The parameters may include, but are not limited to, crosstalk coupling functions or parameters (e.g., $h_k^{n,m}$ for all k, n and m (m≠n) in the algorithm of Table 1) among all lines, gains (e.g., $h_k^{n,n}$ for all k and n), and background noises (e.g., $\sigma_k^n$ for all k and n) of all lines. The parameters may be assumed to remain constant during an implementation of the method 600. Alternatively, if desired, the parameters may be updated during an implementation of the method 600. Further, step 610 may also set various initial parameters for each line (e.g., line n), such as $\text{DPBOFMAX}_{min}^n$, $\text{DPBOFMAX}_{max}^n$, and $\text{DPBOFMAX}_{tol}^n$.

Next, in step 620, a line may be selected from the N lines to configure its transmit PSD profile (or mask). The selected line may be any line in a bundle, not necessarily starting from the first line. The PSD profiles of all N lines may be configured in the method 600. Alternatively, depending on application, only a subset of lines may be configured while using parameters pertaining to all N lines.

Next, in step 630, the cutoff frequency DPBOFMAX may be iteratively optimized for the selected line. Each iteration herein may actually reduce the search ranges of DPBOFMAX frequencies for all N lines by a half. The reduction of search range for each line may be based on comparison of a derived current data rate and a target data rate of the corresponding line. If the derived current data rate is higher than the target data rate, the DPBOFMAX may only be searched in the upper half of its previous range. Otherwise, if the derived current data rate is lower than the target data rate, the DPBOFMAX may only be searched in the lower half of its previous range.

In an embodiment, step 630 may use the algorithm illustrated in Table 1 to derive the current data rate. Herein, the derivation of the current data rate for a line may take into account the parameters of all N lines, such as their transmit PSDs, background noises and crosstalk coupling functions. Some of the accounted parameters (e.g., background noises and crosstalk coupling functions obtained in step 610) may remain constant. Also, some of the accounted parameters (e.g., transmit PSDs) may be updated during each iteration via any suitable algorithm. For example, in one algorithm, the transmit PSD of a cable may be determined based on the frequency (f), a maximum limit of the PSD mask (e.g., DPBOEPSD), the electrical loop length of the cable between the exchange and the cabinet (e.g., DPBOESEL), and parameters of the frequency response of the cable, according to U.S. patent application Ser. No. 12/634,994 entitled "Optimizing the Transmit Power Spectrum Density (PSD) of a Remotely Deployed Line to Ensure Spectral Compatibility," which is incorporated herein by reference. In step 630, since the derivation of the current data rate, in each iteration, may account for conditions of other lines, the final cutoff frequency for the selected line, after the convergence of all iterations, may be the result of a joint (or coordinated) optimization. Such a joint and iterative optimization algorithm may lead to improvement of the overall performance and/or stability of the DSL network.

Next, in step 640, the method 600 may determine if there are more lines to configure PSD profiles. If the condition in the block 640 is met, the method 600 may return to step 620 to configure PSDs for the remaining lines in the binder. Otherwise, the method 600 may proceed to step 650. In step 650, desired signals may be transmitted downstream on the plurality of lines for which PSD profiles have been configured. For example, the signals may be transmitted from a cabinet to a plurality of CPEs.

The method 600 may be implemented via a low complexity algorithm and may improve the overall performance of a DSL network. For example, regarding the "near-far" problem described previously, the disclosed algorithm may help minimize or reduce the impact of crosstalk introduced from the cabinet-deployed lines into the exchange-deployed lines, thus maximizing the spectral friendliness of the cabinet-deployed lines. In addition, the method 500 may be fully compliant with current DSL standards, such as the ITU-T Recommendation G.993.2 entitled "Very-high-speed digital subscriber line transceivers 2 (VDSL2)," February 2006, and ITU-T Recommendation G.992.3 entitled "Asymmetric digital subscriber line transceivers 2 (ADSL2)," April 2009, and ITU-T Recommendation G.997.1 entitled "Physical layer management for digital subscriber line (DSL) transceivers," April 2009, all of which are incorporated herein by reference.

Figure 7:
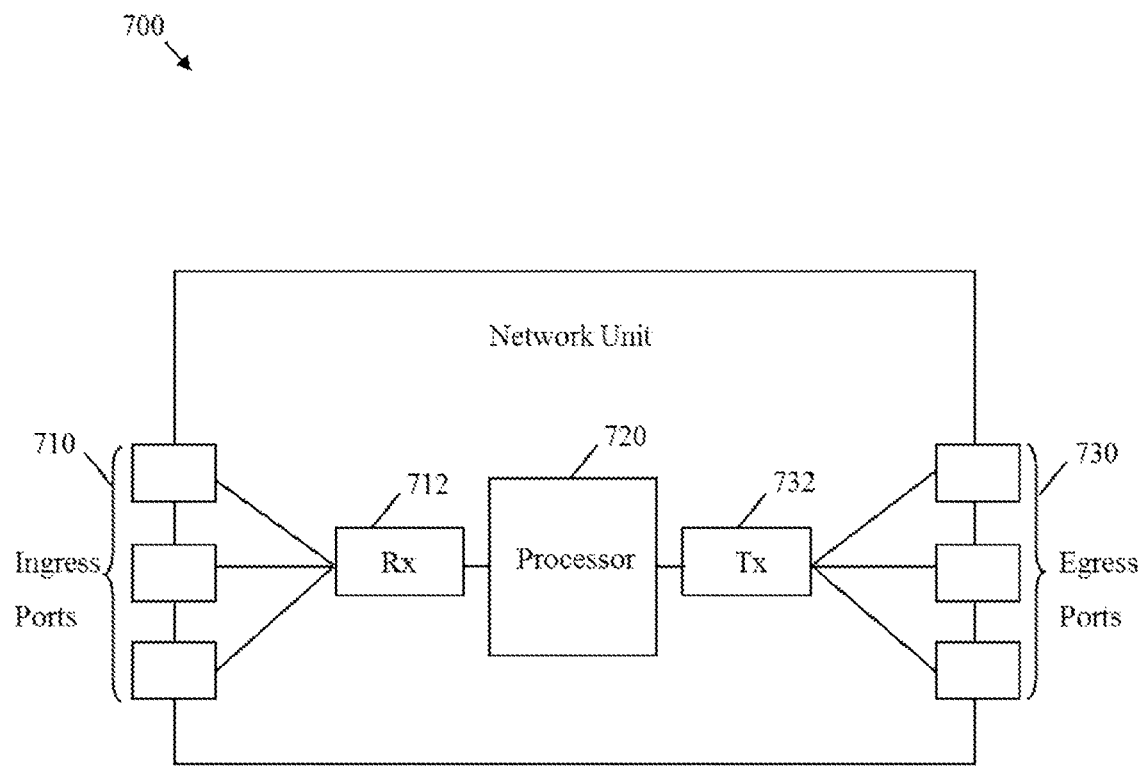
FIG. 7 is a schematic diagram of an embodiment of a network unit.

FIG. 7 illustrates an embodiment of a network unit 700, which may comprise a processor or a transceiver as described above, e.g., within a network or system. The network unit 700 may comprise a plurality of ingress ports 710 and/or receiver units 712 for receiving data, logic unit or processor 720 to process signals and determine where to send the data to, and a plurality of egress ports 730 and/or transmitter units 732 for transmitting data to other systems. The logic unit or processor 720 may be configured to implement any of the schemes described herein, such as the joint and iterative PSD optimization method 500, and may be implemented using hardware, software, or both. For example, the logic unit or processor 720 may include or be coupled to a computer-readable medium, which may be programmed to compute a plurality of cutoff frequencies according to the algorithm in Table 1.

Figure 8:
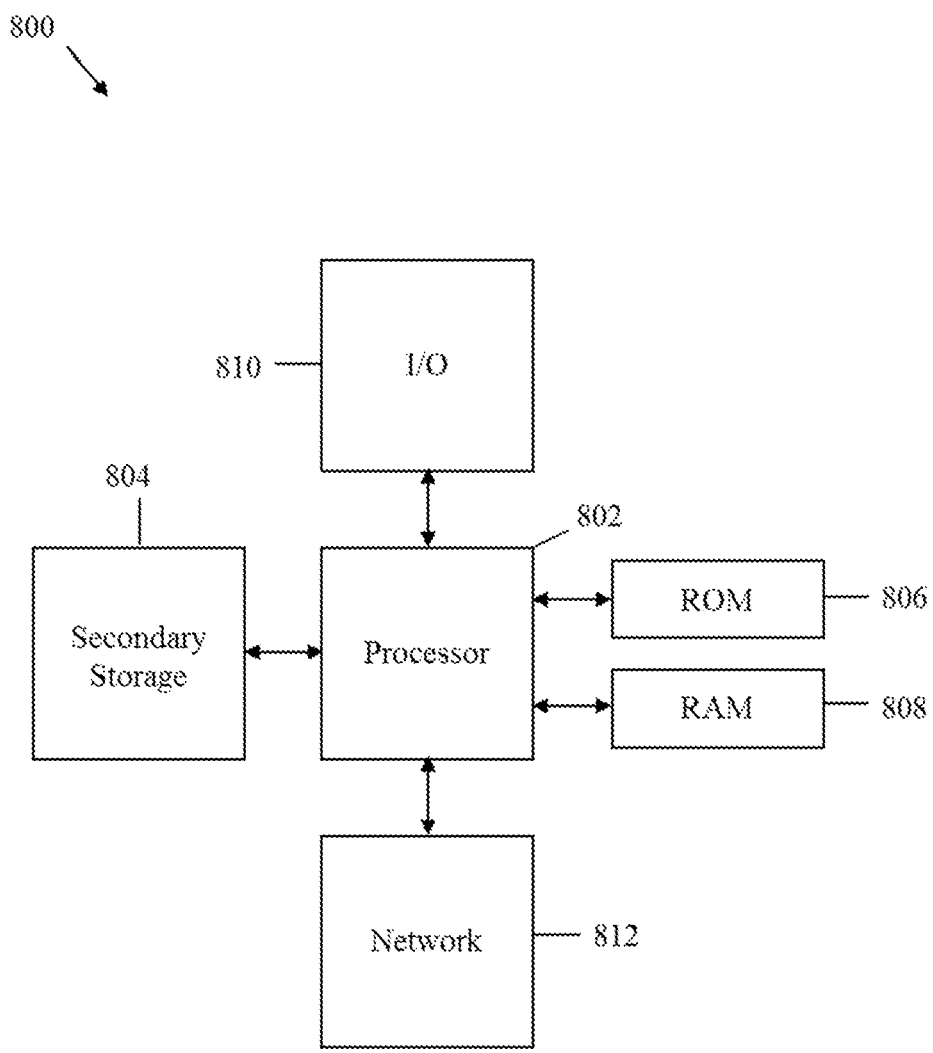
FIG. 8 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 8 illustrates a typical, general-purpose network component or computer system 800 suitable for implementing one or more embodiments of the methods disclosed herein, such as the joint and iterative PSD optimization method 500. The general-purpose network component or computer system 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, one or more cores (e.g., a multi-core processor), or may be part of one or more application specific integrated circuits (ASICs) and/or digital signal processors (DSPs). The processor 802 may be configured to implement any of the schemes described herein, including the joint and iterative PSD optimization method 500, which may be implemented using hardware, software, or both. For example, the processor 802 may include or be coupled to a computer-readable medium, which may be programmed to compute a plurality of cutoff frequencies according to the algorithm in Table 1.

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
    optimizing downstream power backoff (DPBO) parameters of a plurality of cabinet-deployed digital subscriber lines (DSLs) based on crosstalk coupling parameters among the cabinet-deployed DSLs,
    wherein the DPBO parameters include a plurality of cutoff frequencies, each of which corresponds to one of the plurality of DSLs, and
    wherein optimizing the DPBO parameters comprises:
    for each line n, where n equals 1 to N, where N is a total number of the plurality of DSLs:
        for each subcarrier k, where k equals 1 to K, where K is a number of subcarriers:

determining a gain $h_k^{n,n}$ and a background noise parameter $\sigma_k^n$, and for each line m, where m equals 1 to N, where m≠n:
determining a crosstalk coupling parameter $h_k^{n,m}$ from line m into line n, and setting initial values of variables $DPBOFMAX_{max}^n$ $DPBOFMAX_{min}^n$, and $DPBOFMAX_{tol}^n$, wherein the initial values satisfy a constraint ($DPBOFMAX_{max}^n - DPBOFMAX_{min}^n > DPBOFMAX_{tol}^n$);

for each line i, where i equals 1 to N, iteratively repeating the following steps until $DPBOFMAX_{max}^i - DPBOFMAX_{min}^i \leq DPBOFMAX_{tol}^i$:

for each line n, where n equals 1 to N, performing the following steps if $DPBOFMAX_{max}^n - DPBOFMAX_{min}^n > DPBOFMAX_{tol}^n$:

determining an intermediate cutoff frequency $DPBOFMAX_{int}^n$ as $DPBOFMAX_{int}^n = (DPBOFMAX_{max}^n + DPBOFMAX_{min}^n)/2$, for each subcarrier $f_k$, where k equals 1 to K, where K is a number of subcarriers, determining a transmit power spectral density (PSD) parameter $s_k^n$ based on the intermediate cutoff frequency, determining a data rate $R^n$ based on the transmit PSD parameters and a plurality of the crosstalk coupling functions corresponding to all DSLs, and if, $R^n > R_{target}^n$, set $DPBOFMAX_{min}^n$ equal to $DPBOFMAX_{int}^n$, and otherwise set $DPBOFMAX_{max}^n$ equal to $DPBOFMAX_{int}^n$, where $R_{target}^n$ is a required data rate; and determining the cutoff frequency of the PSD profile as a final intermediate cutoff frequency produced by the iterative steps.

2. The method of claim 1, wherein determining the transmit PSD $s_k^n$ comprises computing $$s_k^n = \begin{cases} PEPSD^n(f_k) & \text{if } f_k < DPBOFMAX^n \\ DPBOEPSD^n(f_k) & \text{if } f_k \geq DPBOFMAX^n, \end{cases}$$

where $DPBOFMAX^n$ is the cutoff frequency for line n, $PEPSD^n(f_k)$ is a reduced PSD portion, and $DPBOEPSD^n(f_k)$ is a maximum portion, and wherein PEPSD(f) is substantially lower than a frequency-dependent maximum limit and DPBOEPSD(f) is substantially equal to the maximum limit.

3. The method of claim 2, wherein determining the data rate $R^n$ comprises computing $$R^n = f_s \sum_k \min\left(b_{max}, \log_2\left(1 + \frac{1}{\Gamma} \frac{|h_k^{n,n}|^2 s_k^n}{\sum_{m \neq n} |h_k^{n,m}|^2 s_k^m + \sigma_k^n}\right)\right),$$

where $f_s$ is a discrete multi-tone (DMT) symbol rate, $b_{max}$ is a maximum allowed number of bits per subcarrier, and $\Gamma$ is a Signal to Noise Ratio (SNR) gap to capacity.

4. The method of claim 1, wherein optimizing the DPBO parameters is performed by a Spectrum Management Center (SMC).

* * * * *